Feb. 17, 1970   JEAN-MARIE JOLLOIS   3,496,396
EDDY CURRENT BRAKING DEVICES
Filed Sept. 16, 1966   3 Sheets-Sheet 2

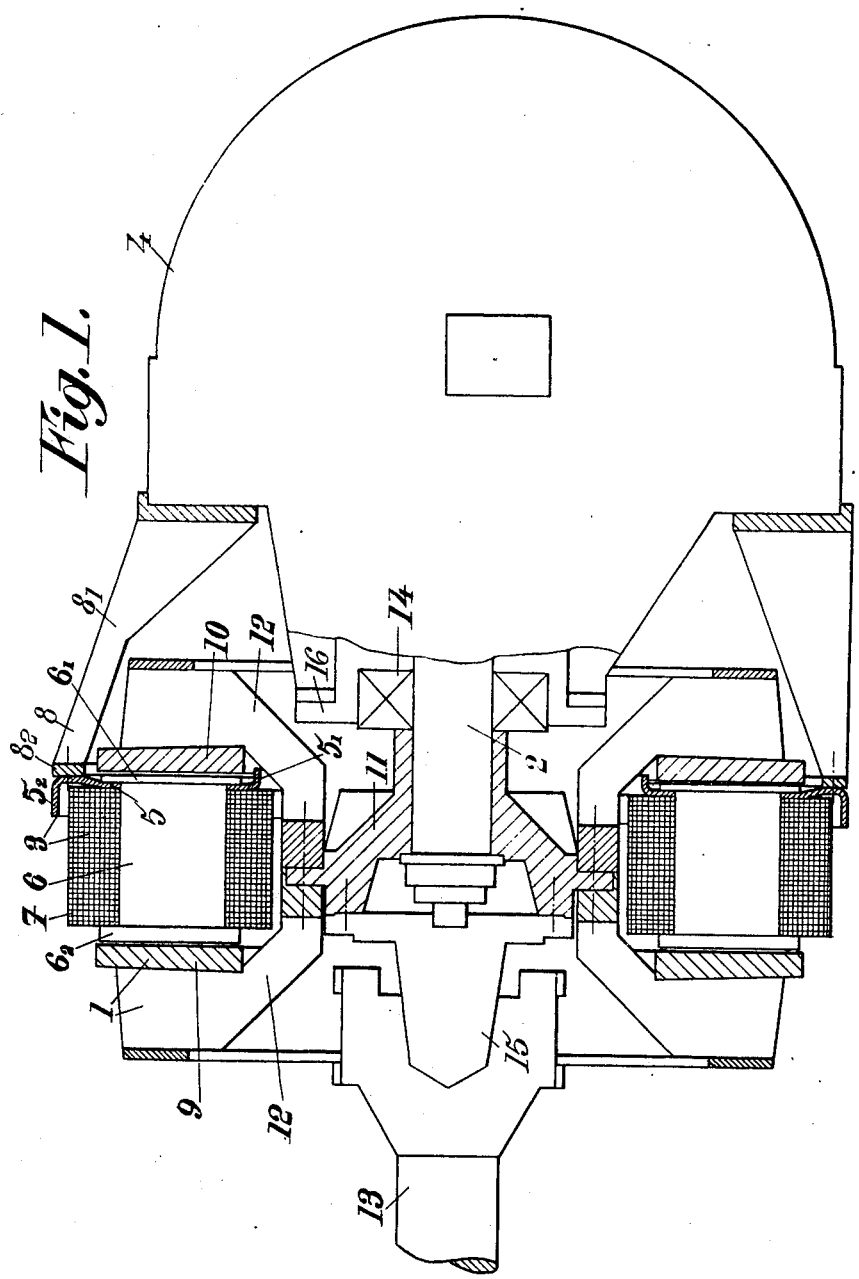

INVENTOR
JEAN-MARIE JOLLOIS
BY
Bailey, Stephens+Huettig
ATTORNEY

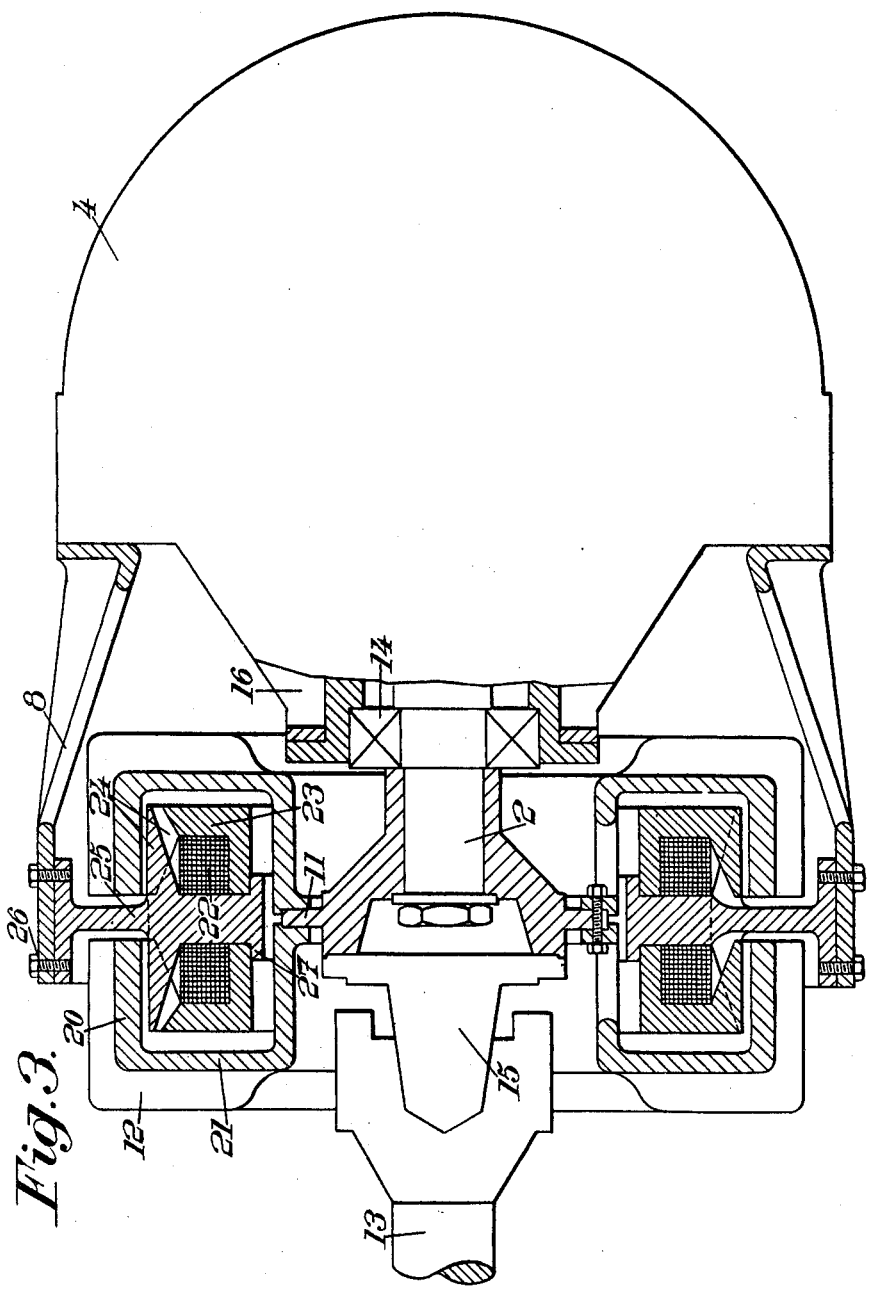

United States Patent Office 3,496,396
Patented Feb. 17, 1970

3,496,396
EDDY CURRENT BRAKING DEVICES
Jean-Marie Jollois, Courbevoie, France, assignor to
Labavia S.G.E., Paris, France, a society of France
Filed Sept. 16, 1966, Ser. No. 580,075
Claims priority, application France, Sept. 16, 1965,
31,649; July 22, 1966, 70,556
Int. Cl. H02k 49/00
U.S. Cl. 310—93     9 Claims

ABSTRACT OF THE DISCLOSURE

The braking device comprises a stator overhanging from a gear casing—either the casing of the gear box or the casing of the differential—and a rotor secured to the shaft to be braked overhanging from that casing, so that the rotor overhangs with the shaft. The rotor is in the form of a fork with two branches straddling the stator and with a handle formed by a central plate located within the axial overall dimension of the stator.

---

This invention relates to the construction of eddy current braking devices associated with the power transmission system of a vehicle. More particularly, the invention relates to a motor vehicle transmission system including an eddy current retarder wherein the rotor thereof is associated with a transmission shaft of the vehicle, and wherein the stator thereof is secured to a gear casing of the vehicle. This gear casing can be the casing of the gear box or the casing of the final drive differential. In some modern vehicles such as semi-trailer tractors and rear engined coaches, there is frequently only a small distance between the gear box and the final drive, and in such circumstances, the retarder must be constructed to occupy a minimum of space.

One object of the invention is to improve retarders on vehicle transmissions in respect of practical requirements.

According to this invention therefore, there is provided a vehicle transmission including an eddy current retarder adapted to provide a braking torque on the transmission, the rotor of the retarder comprising a single plate secured to a transmission shaft so as to rotate therewith, the stator being secured to a gear casing, and wherein the stator comprises at least one winding and a magnetic structure, i.e. a structure capable of being magnetised, associated with the or each winding so that when the or each winding is electrically energised there are at least two rings of magnetic poles formed, the polarities of which are alternately north and south in each ring and wherein the rotor presents two areas or surfaces disposed symmetrically in relation to one another with respect to the central transverse plane of the retarder, each area or surface being aligned with a ring of poles which it complements, and being adapted to revolve upon rotation of the transmission shaft, the said surfaces being connected to external cooling blades and both being borne by the said single plate.

Desirably that surface of the rotor which is remote from the gear casing bearing the stator may be axially recessed so as at least partially to contain one of the elements of a constant velocity transfer system.

Preferably the rotor may be overhung on its shaft from a bearing carried by an extension of the casing carrying the stator.

Conveniently the rotor surfaces are provided on two aligned annular discs. In this case the stator may consist of a substantially non-magnetic support one of the surfaces of which bears an even number of coils provided to energise magnetic cores extending in parallel relationship to the longitudinal axis of the transmission shaft.

Alternatively the two rotor surfaces may each be provided on a cylindrical annular element, and in this case the stator may comprise two windings in the form of rings centered on the longitudinal axis of the transmission shaft and each housed in a magnetic annular channel on which the outwardly extending opening is partly closed by overlapping fingers which form pole shoes.

In order that the present invention may be more readily understood, three embodiments of a portion of a vehicle transmission incorporating an eddy current retarder and according to the invention will now be described, by way of example, and with reference to the accompanying drawings in which:

FIGURE 1 is a part sectional view through the longitudinal axis of a propeller shaft and final drive housing, the stator of the retarder being secured to the housing, and the rotor being secured to the propeller shaft.

FIGURE 2 and FIGURE 3 are views, similar to that of FIGURE 1, of two further embodiments of an assembly according to the invention.

Figure 4:
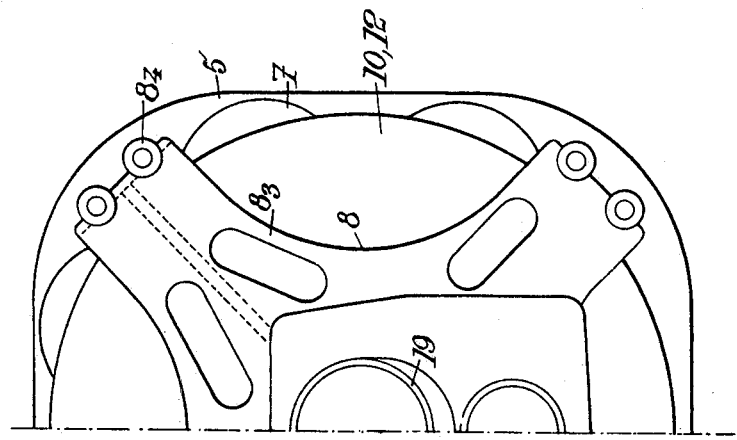
FIGURE 4 is a section on the line IV—IV of FIGURE 2.

In the embodiment illustrated in FIGURE 1, a rotor 1 of an eddy current retarder is mounted on an extension 2 of the input shaft to the final drive differential of a motor vehicle, and the stator 3 of the retarder is rigidly secured to the casing 4 of the final drive.

The stator comprises a non-magnetic hollow disc 5, for example of stainless steel, which is reinforced around its inner periphery by a flange $5_1$, and around its outer periphery by a flange $5_2$.

An even number of magnetic cores 6 are mounted on this disc and extend in parallel relationship to the longitudinal axis of the retarder. These cores terminate in shoes $6_1$ and $6_2$ of pillbox shape. Each core extends through an aperture provided in the disc 5 and is secured to the said disc by its shoe $6_1$ being welded thereto.

A coil is mounted around each core 6 whereby to produce a magnetic flux in the core when desired.

The various coils are connected to an energisation current source (not shown) so that the field magnetic poles produced in the shoes $6_1$ and $6_2$ are alternately north and south in each ring of shoes.

The disc 5 is overhung on the free end of a bell-shaped structure 8 borne by the casing 4. This structure may consist of a body of revolution which may or may not be perforated. Alternatley, as in the preferred embodiment illustrated, it consists of a succession of arms $8_1$ each having a flange $8_2$ at its free end.

The disc 5 is preferably adjustably mounted on the structure 8, for example through the agency of screws screwed into the disc (or into said structure 8) cooperating with elongated apertures radially formed axially in the said structure 8 (or in said disc).

Since there is only a single disc 5, the stator mass mounted on the structure 8 is relatively light and has a relatively small axial dimension, and these are valuable advantages with the overhung arrangement in question.

The rotor 1 of the retarder comprises two annular magnetic discs 9 and 10, aligned with the shoe rings $6_2$ and $6_1$ respectively and secured to the shaft 2 and to the discs 9, 10. Blades 12 connect the plate 11 to the discs 9 and 10 and act as fan blades to cool the discs 9 and 10, which form the armature of the retarder.

FIGURE 1 also shows the double Cardan or propeller shaft 13, which connects the shaft 2 to the gearbox, one of the universal joints 15 of the shaft being directly mounted on the plate 11 and being axially housed partly inside the rotor 1. A bearing 14 is borne by a frustoconical projection or "lug" 16 of the casing 4 and is situated inside the rotor 1 to provide the overhung mounting for the rotor.

In the embodiments illustrated in FIGURES 2 and 4 and in FIGURE 3, those elements which correspond to the elements described with reference to FIGURE 1 bear the same reference numerals.

Figure 2:
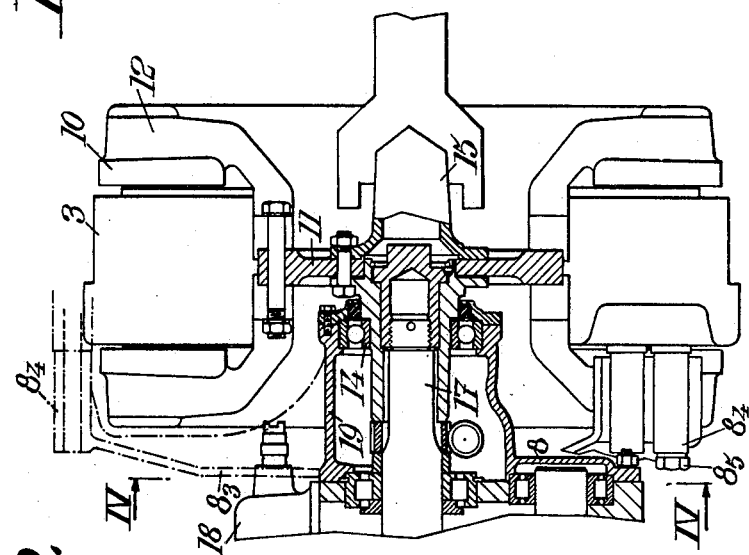

The embodiment shown in FIGURES 2 and 4 differs mainly from the previous embodiment in that the rotor 1 is mounted on an extension 17 of the output shaft of a gearbox and in that the stator 3 is rigidly secured to the casing 18 of the gearbox.

The structure 7 in this case consists of a flat casing having apertured radial arms 8₃, the ends of which bear axially extending bushes 8₄ adapted to receive bolts 8₅ for securing the disc 5.

The lug, the free end of which supports the bearing 14, is in the case integral with the said component 8 and is in the form of a tube length 19.

In the embodiment shown in FIGURE 3, the arrangement is similar to FIGURE 1, but the eddy current retarder is of a different type.

The two elements provided on the rotor which revolve and in which the eddy currents are produced are in this case not aligned parallel discs but coaxial cylindrical sleeves 20 connected to the central plate 11 by skirts 21 which form an annular casing. The sleeves and skirts are connected on the outside to cooling blades 12.

The stator comprises two windings 22 in the form of rings centered on the retarder axis and each housed in a magnetic channel 23.

The opening of each channel extends radially to the exterior and is partially closed by fingers 24 which overlap one another and are magnetically connected in alternating sequence to two side walls of said channel.

Such an arrangement provides two rings of poles constituted by the fingers 24 having alternating polarities around each ring, which latter is enclosed by a sleeve 20. In other words, the magnetic flux produced by the electrical energisation of a winding 22 in the corresponding channel 23 tends to leave said channel by all the fingers 24 originating in one of its side walls, then return by the other fingers after having followed sections of the facing the rotor sleeve 20 which surrounds these fingers with a slight clearance to form an air gap.

In the construction illustrated, the contiguous side walls of the two channels 23 merge into a single magnetic flange 25 which extends through the gap between the two sleeves 20 and is bolted at 26 to the structure 8 connected to the casing 4. Also, the fingers 24 corresponding to the said contiguous walls form a single unit with the said flange, from which they project. The mounting of the remaining part of the channels on this flange is facilitated by the presence of annular lugs 27 at the inner periphery of the flange 25.

This arrangement with two windings is particularly advantageous, because there is no need for accurate axial adjustment of the rotor with respect to the stator, since the air gaps therebetween are radial, and because the fitting of the windings, of which there are just two, is very simple. Additionally, the intensity of the current applied to the windings 22 to obtain a given braking torque is relatively low.

To summarize, therefore, in preferred embodiments of the invention the retarder rotor is mounted on a central plate of small axial dimensions rigidly secured to an extension of the input shaft to the final drive, or to the output shaft of the gearbox, the extension preferably being overhung from a bearing borne by the end of a lug forming part of the final drive or the gearbox casing. In axial half-section, the rotor has the general shape of a fork by being provided with two ring-like areas in which the eddy currents are produced when required, the elements being symmertically disposed with respect to the central tranverse plane of the retarder, and being externally connected to cooling blades. The stator is mounted on the said gearbox or final drive casing, and is so arranged that its axial half-section is straddled by the said fork and its electrical energisation produces two rings of field poles opposed to the respective ring-like areas of the rotor.

It will be appreciated that as a result of the symmetrical arrangement of the rotor areas in which the eddy currents are produced, this rotor is not subject to substantial bending forces or axial stresses during operation of the retarder, so that the central plate can be given a small axial dimension and the mounting of this plate on its shaft is thus facilitated.

This small axial dimension of the plate reduces the weight of the rotor and this is very advantageous in the preferred case of an overhung arrangement of the rotor, in which the retarder has no bearing of its own, so that its provision does not require any additional bearing in the transmission.

If the rotor surface remote from the casing bearing the stator is given a hollow shape adapted at least partly to contain one of the elements (universal joint of the like) of the consant velocity transfer system, space is again saved.

However, despite this small axial dimension of the central plate, the dimensions and hence the efficiency of the cooling blades for dissipating the heat are not substantially limited, since the blades may extend freely on either side of the rotor leaving free the central volume required for the transmission elements.

Accordingly, the invention facilitates the provision of a retarder in the transmission system in vehicles where only a small space is available between the pearbox and the differential.

Of course, as will be apparent from the foregoing, the invention is not limited to precise applications and embodiments above-described, but covers many variants thereof, more particularly cases in which the retarder is of a symmetrical type other than the types described hereinbefore. For example, a retarder according to the invention might be constructed in a similar fashion to the example of FIGURE 1, but with double windings borne on either side of an intermediate magnetic disc. In a further embodiment, a retarder might be similar to the type shown in FIGURE 3 but with such channels mounted back-to-back and axially open opposite two rotor discs. Alternatively the retarder could be of the type in which the stator comprises a single winding centered on its axis.

What is claimed is:

1. In a vehicle transmission including a gear casing and a short transmission shaft overhanging from a bearing carried by said casing, an eddy current braking device comprising, arranged around the axis of said shaft: an annular stator secured to said casing by means of a structure axially overhanging from said casing, said stator being arranged as an inductor and comprising for this purpose at least one electrical winding with corresponding pole pieces forming two crowns of poles of alternately opposite polarities in each crown; and a rotor secured to and overhanging with the free end of said short shaft, said rotor having in axial half-section the form of a fork with two branches which open in the outward direction from said axis, said branches straddling said annular stator, the rotor parts which correspond to said branches forming two continuous magnetic rings arranged symmetrically with respect to a plane normal to said axis and respectively facing said inductor crowns so that upon magnetization of said inductor eddy currents are produced in said rings, said rings being provided with external cooling blades, and the rotor part which corresponds to the handle of said fork forming a central plate located within the axial overall dimension of the annular stator.

2. A vehicle transmission as claimed in claim 1 including a driving shaft operatively connected via a universal joint with said transmission shaft, wherein said rotor defines a recess on the side thereof remote from said gear casing, said universal joint being at least partially housed in said recess.

3. A vehicle transmission as claimed in claim 1, including a small cross-section extension of said gear casing, wherein said bearing from which said short transmission shaft overhangs is carried by said small cross-section extension of said casing.

4. A vehicle transmission as claimed in claim 1, wherein said two continuous magnetic rings, formed by the rotor parts which correspond to said branches of said fork, are comprised respectively by two aligned discs lying in parallel planes at right angles to the axis of said transmission shaft.

5. A vehicle transmission as claimed in claim 4 wherein said stator comprises a substantially non-magnetic support, and wherein said electrical winding comprises an even number of coils attached to said substantially non-magnetic support, said pole pieces comprising magnetic cores extending in parallel relationship to the longitudinal axis of said transmission shaft.

6. A vehicle transmission as claimed in claim 5, wherein each magnetic core terminates in two shoes in the form of pillboxes, said support defining an aperture, one said shoe extending through said aperture from the side of said aperture remote from said gear casing to the side of said aperture near to said gear casing and being secured to said support on the side thereof near to said gear casing.

7. A vehicle transmission as claimed in claim 1, wherein said rotor parts which correspond to said branches of said fork, respectively have the form of two troughs open towards said normal plane with respect to which said two troughs are symmetrically arranged, said two crowns of stator pole pieces being disposed at the interior of said two troughs respectively, and said two continuous magnetic rings of the rotor being disposed radially outwards of said two crowns of stator pole pieces respectively, said two continuous magnetic rings being formed respectively by the one of the two sides of the trough which one side is the more remote from the axis of said transmission shaft, and said two continuous magnetic rings respectively having the form of two aligned cylindrical sleeves co-axial with the axis of said transmission shaft.

8. A vehicle transmission as claimed in claim 7, wherein the electrical winding of said stator comprising two windings in the form of rings centered on the longitudinal axis of the transmission shaft, two annular magnetic channels respectively housing each said ring of electrical winding, said pole pieces being in the form of overlapping fingers extending from said channels partially to close said channels.

9. A vehicle transmission according to claim 1, wherein said external cooling blades form part of the branches of the fork and comprise extensions which extend beyond the continuous magnetic rings radially inward of the braking device and which are inclined towards the transverse plane of symmetry of the braking device with respect to their external part which extends along the external surface of said rings, the interior ends of said extensions being fastened to the handle of the fork.

References Cited

UNITED STATES PATENTS

| 2,497,402 | 2/1950 | Findley | 310—105 |
| 2,503,704 | 4/1950 | Bessiere | 310—93 |
| 2,842,690 | 7/1958 | Bessiere | 310—93 |
| 3,381,152 | 4/1968 | Bessiere | 310—93 |

FOREIGN PATENTS

| 544,574 | 6/1956 | Italy. |
| 609,698 | 12/1960 | Canada. |

ORIS L. RADER, Primary Examiner

A. G. COLLINS, Assistant Examiner